United States Patent [19]

Lucas et al.

[11] 4,160,252

[45] Jul. 3, 1979

[54] METHOD OF DETERMINING THE DIRECTION OF A RADIO SOURCE AND RADIO INTERFEROMETER SYSTEM

[75] Inventors: David A. Lucas, Crawley Down; Richard P. Vincent, Crawley, both of England

[73] Assignee: U.S. Philips Corporation, New York, N.Y.

[21] Appl. No.: 888,839

[22] Filed: Mar. 22, 1978

[30] Foreign Application Priority Data

Mar. 25, 1977 [GB] United Kingdom ............... 12628/77

[51] Int. Cl.² ............................................. G01S 3/48
[52] U.S. Cl. ............................................. 343/113 R
[58] Field of Search ..................... 343/113 R, 113 DE

[56] References Cited

U.S. PATENT DOCUMENTS

3,005,198  10/1961  O'Meara ........................ 343/113 R
3,889,267  6/1975  Lucas et al. ..................... 343/113 R

*Primary Examiner*—Maynard R. Wilbur
*Assistant Examiner*—Richard E. Berger
*Attorney, Agent, or Firm*—Algy Tamoshunas

[57] ABSTRACT

Method of determining the direction of a radio source, wherein, using a circular array of aerials, a sinusoidal phase graph is determined and the direction of the radio source relative to a reference direction is determined from one or more zero crossings of the phase graph.

5 Claims, 15 Drawing Figures

METHOD OF DETERMINING THE DIRECTION OF A RADIO SOURCE AND RADIO INTERFEROMETER SYSTEM

The invention relates to a method of determining the direction of a radio source, using a circular array of evenly-spaced aerial elements to find the phase differences between the signals from the source and received by successive pairs of aerial elements, from said phase differences a position on the circle being determined indicative of the direction of the radio source. The invention also relates to a radio interferometer system for measuring the angle of incidence of signals deriving from such a source.

Methods and systems of this type are, for example, used in radio-navigation arrangements for air-craft.

The technique of using radio interferometer pairs to determine the direction of a radio source is known and an arrangement is disclosed in, for example, German Offenlegungsschrift No. 2011147.

It is an object of the invention to provide a method of the type defined above by means of which an accurate indication of the direction of a radio source can be obtained in a simple digital manner.

In accordance with the invention a method for determining the direction of a radio source is characterized in that in digital form a plurality of phase differences are measured, the magnitude of the phase differences occurring for successive pairs of aerial elements having a sinusoidal variation, in that each digitally-expressed phase difference is examined to determine at least one point where the sinusoid crosses the zero axis and in that from this zero crossing point a position on the circle is derived indicative of the angle of incidence of the rays from the source relative to a reference direction.

Furthermore, a radio interferometer system for measuring the angle of incidence of the signals from a radio source is characterized in that means are provided for deriving from the output signals of the discriminators a series of digitally-expressed numbers representing the ordinates of a sinusoidal phase graph, in that means are provided for examining the series of numbers to determine at least one point at which the phase graph has a value of zero and in that means are provided for deriving from this zero point a position on the circle indicating the direction of the source relative to a reference direction.

The interferometer measurements can be effected in several manners: for example, a plurality of interferometer pairs can be formed by an element in the centre of a circle and one of the elements on the circle circumference. Alternatively, the pairs can be formed by adjacent elements on the circle circumference. Furthermore the pairs can be formed by a given element and an element spaced from it by one or more elements.

A system for receiving energy of a wavelength $\lambda$ may comprise a substantially omnidirectional aerial element at the centre of the circle, this central element and each of the circumferential elements forming a plurality of interferometer pairs, all of the same spacing R, where R is the radius of the circle and wherein the angle subtended at the centre of the circle by two adjacent elements is not greater than $\lambda/R$ radians.

Alternatively, the interferometer pairs are formed one by each adjacent pair of elements.

In another arrangement the interferometer pairs are formed one by each element and another element spaced from it by one or more elements.

The invention will now be further explained with reference to the accompanying diagrammatic drawings in which.

Figure 1:
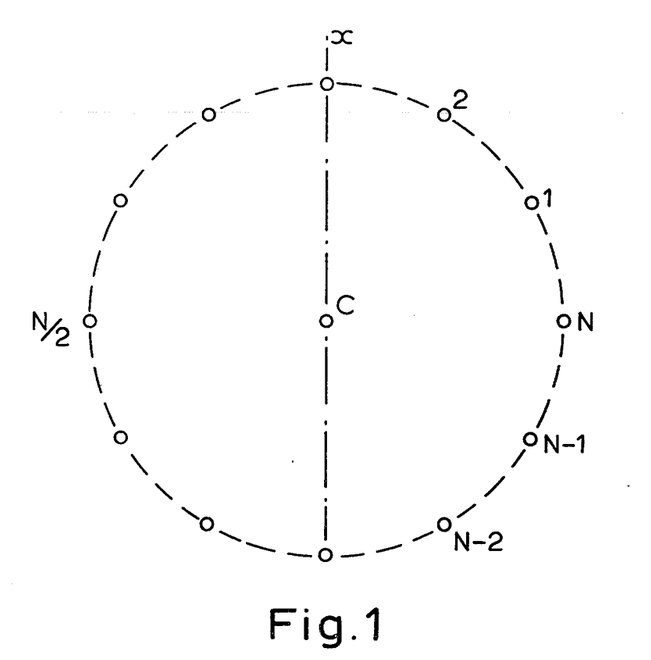
FIG. 1 illustrates an array of aerial elements.

FIG. 1 shows an array of N aerial elements equally spaced around the circumference of a circle of radius R together with a central element C at the centre of the circle. Let all these aerial elements be omnidirectional, that is to say have equal receiving properties in any direction in the horizontal plane; the simplest form of such an aerial is of course a monopole. Let us define a reference axis x passing through the central element C and at right angles to an axis passing through the element N and the central element C. Let phase measurements be made between the central element C and each of the other N elements and let the sign of the phase be such that the measurement is that of each of the circumferential elements relative to the central element. Then the phase difference measured by the $p^{th}$ element may be written:

$$\phi_p = (2\pi R/\lambda) \sin(\theta + 2\pi p/N) \tag{I}$$

where $\lambda$ is the signal wavelength and $\theta$ the angle of incidence relative to the reference axis x. It should be noted that $\theta$ can be positive or negative.

Figure 2:
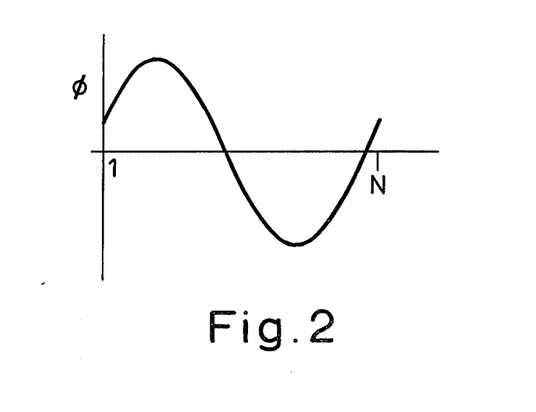
FIG. 2 is a phase graph.

Let us now construct a graph in which the various measured phase differences $\phi_1 \ldots \phi_n$ for each of the interferometer pairs are plotted against the angle of that pair relative to the datum axis x, that is to say against the number of the peripheral aerial elements. In the absence of propagation errors the measured phase differences $\phi_1 \ldots \phi_n$ lie on the sine curve defined by expression (1) above and illustrated in FIG. 2. The angle of incidence can be derived from the position of one or both zero crossings of this sine curve.

It is convenient now to consider the results of the various phase measurements somewhat more closely. Let us consider the actual phase difference at the $p^{th}$ element in the array: then we may write:

$$\phi_p = (I_p + F_p) \cdot 2\pi \tag{II}$$

where $F_p$ is a fraction between 0 and 1 and $I_p$ an integer.

It is also convenient at this point to distinguish two sizes of array; an array for which the phase differences all lie within a range of $2\pi$ radians, for example 0 to $2\pi$ or $-\pi$ to $+\pi$ and a larger array for which the phase differences exceed this range.

It is of course well known that it is possible to measure unambiguously phase differences which lie in a range of less than $2\pi$ radians and one arrangement for doing this is described in United Kingdom Specification No. 1,295,010 (U.S. Pat. No. 3,768,007) and it is immediately obvious that if in expression (I) above R is less than $\pi$ then such unambiguous differences can be used without further processing to construct the graph discussed above with reference to FIG. 2. In practice it is advisable to provide some margin of safety to provide for the instrumental errors and propagation effects such, for example, as reflections and in practice a margin of 50% has been found to be quite sufficient in all but very unusual circumstances so that an array of diameter $\lambda$ can in general be taken as capable of providing a series of unambiguous phase differences. In these circumstances $I_p$ in expression (II) is equal of course to zero.

However, if the radius R of the array in terms of wavelength $\lambda$ is so large that the phase differences can exceed $2\pi$ so that $I_p$ is unequal to zero, it is necessary to introduce some further processing.

Now the interferometer pair can only measure $2\pi F_p$ so that for $p=1$, that is to say on the first of our measurements, we do not know the value of $I_1$. The procedure for finding the actual value of $I_1$ will now be outlined.

Figure 3:
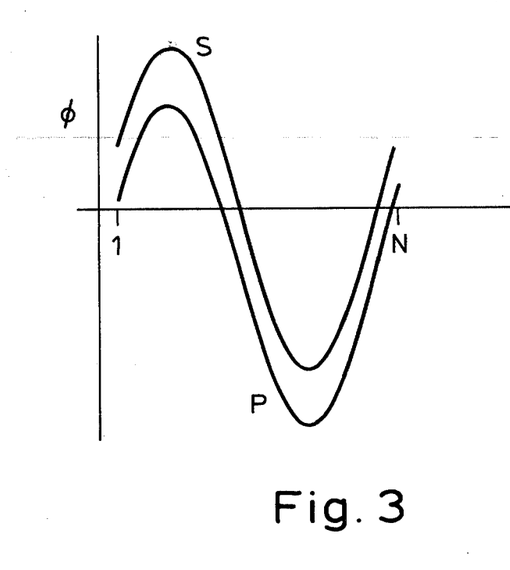
FIG. 3 illustrates further phase graphs.

If it is assumed that $I_1=0$ a primary phase/angle graph as illustrated at P in FIG. 3 can be drawn. However, if in fact $|I_1|$ is not equal to zero, then each measured value of $\phi$ is, as the case may be, an amount of $|I_1|$ larger or smaller than the actual value of $\phi$. Thus it is necessary to determine $I_1$ after which the horizontal axis can be shifted to account for this as yet unknown quantity.

Consider the sum of all the true values of $\phi_p$, that is evaluate $(\phi_1+\phi_2+\ldots \phi_N)$. From expression (I) above we may write $$\oint \phi_p \cdot dN = 0 \qquad (III)$$

which for the arrangement illustrated in FIG. 1 becomes the difference equation $$\sum_{p=1}^{N} \phi_p = 0 \qquad (IV)$$

Now let us sum all measured values $$\phi'_p \sum_{1}^{N} \phi'_p$$

Remembering that any error in $I_1$ is cummulative, that it is to say it will be repeated at each element we measure, we can now write:

$$\sum_{1}^{N} \phi_p = \sum_{1}^{N} \phi'_p + NI_1 \qquad (V)$$

We can see by reference to FIG. 3 that in fact our graph is not symmetrical about the horizontal axis and that this means, in this special case that $$\sum_{1}^{N} \phi'_p$$

is negative so that it follows that $I_1$ is positive. By substituting equation (IV) in equation (V) we can now write:

$$I_1 = -\sum_{1}^{N} \phi'_p \cdot \frac{1}{N} \qquad (VI)$$

which means simply that the whole curve must be shifted upwards by an amount equal to $I_1$ as illustrate in FIG. 3 thus resulting in a properly aligned horizontal axis and giving the correct or "secondary" phase graph S.

Having obtained the secondary phase graph the next step is to find the position of at least one zero crossing.

Because in practice in theoretical sine curve is represented by a number of discrete points, each subject to error, an approximation procedure must be effected.

Figure 4:
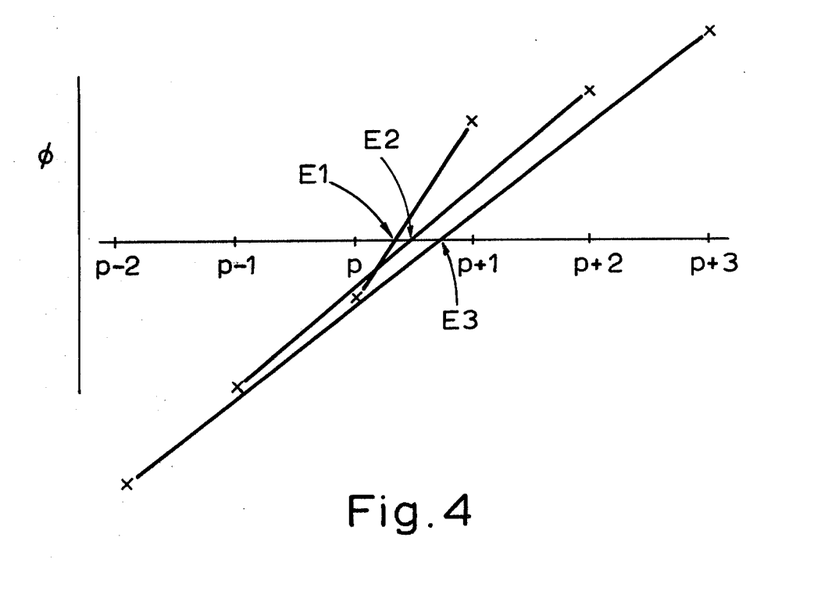
FIG. 4 illustrates a method of determining a zero crossing of a phase graph.

The simplest approach involves a straight line estimate using the two closest points at E1 in FIG. 4, yielding an estimate for the zero crossing:

$$E_1 = p + \phi_p/(\phi_p - \phi_{p+1}) \qquad (VII)$$

using other adjacent points we can estimate $$E_2 = p - 1 + 3\phi_{p-1}/(\phi_{p-1} - \phi_{p+2}) \qquad (VIII)$$

and $$E_3 = p - 2 + 5\phi_{p-2}/(\phi_{p-2} - \phi_{p+3}) \qquad (IX)$$

and so on as far as appropriate, from which we can derive an average estimate $$E_{av} = (E1 + E2 + E3 + \ldots E5) \cdot (1/Q) \qquad (X)$$

where Q is the number of estimates.

Figure 5:
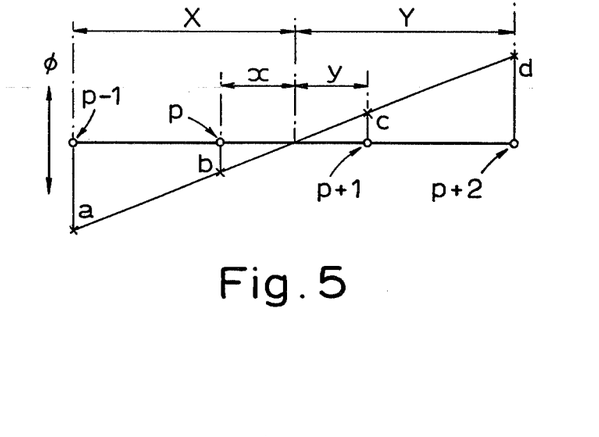
FIG. 5 illustrates another method of determining a zero crossing.

Another method of finding a zero crossing is illustrated in FIG. 5 in which, for simplicity four measured phases are shown lying along a straight line crossing the zero axis. From the Figure it now appears that:

$X = 1 + x$ and $Y = 1 + y$ $X/Y = a/d$ and $x/y = b/c$ $X + Y = 3$ units and $x + y = 1$ unit, from which $X = 3a/(a+d)$ $x = b/(b+c)$ $X = 1 + x = (3a + 2b + c)/(a + b + c + d)$ similarly, $x = X - 1 = (2a + b - d)/(a + b + c + d)$.

If we now designate the $p^{th}$ element as that immediately preceding the zero crossing XP, then we may write, as the position of that crossing point expressed as a "count" of elements from the datum axis $$XP = p + \left[ (2\phi_{p-1} + \phi_p - \phi_{p-2}) \Big|_{p-1}^{p+2} \right] \phi \quad \text{(XI)}$$

because in FIG. 5 a now is $\phi_{p-1}$, $b=\phi_p$ and so on. It will be observed that the values of all points, in this case four, within the range of measurements are taken into account.

If desired, the position of the two zero crossings of the sinusoid can be determined, for example by one of the approximation techniques outline above, and the two values can be averaged to give the angle of incidence because the angle of incidence is theoretically midway between the two zero crossings. If, for example, the values 3.25 and 13.75 are obtained for the positions of the zero crossings at N=20 the average bearing is an $\frac{1}{2}(3.25+13.75) = 8\frac{1}{2}$ units, that is to say $8\frac{1}{2}(360/20) = 153°$ degrees from the datum axis. The read out will of course basically be in digital form but this may be converted basically to any suitable required form, for example to degrees by multiplying by (360/N), or again for example by angularly indexing a radial trace on a cathode-ray display to a position representing the angle of incidence.

As would be expected a minimum number of elements, or put differently, a maximum angle between two adjacent elements is required for unambiguous determination of the signal direction.

The incremental phase shift $\delta\phi$ between the measurements made between each of the two adjacent elements and the centre element is given by $\delta\phi_p = \phi_p - \phi_{p-1}$. By differentiating expression (I) we obtain:

$$\delta\phi_{max} = (2\pi R/\lambda) \cdot \delta\theta \quad \text{(XII)}$$

where $\delta\theta$ is the angle, in radians, subtended at the centre of the circle by the two elements. For unambiguous resolution $\delta\phi$ must not exceed $2\pi$ so it can be written $$\delta\theta_{max} = 2\pi(\lambda/2\pi \cdot R) = \lambda/R \quad \text{(XIII)}$$

or because $\delta\theta = 2\pi/N$:

$$N_{min} = 2\pi R/\lambda \quad \text{(XIV)}$$

If one allows for 50% error, that is to say a phase difference of $\pi$ for instrumental errors and propagation effects thereby imposing a limit value of $\pi$ on $\delta\phi$ then $$\left.\begin{array}{l} \delta\theta_{max} = \lambda/2R \\ \text{and} \\ M_{min} = 4\pi R/\lambda \end{array}\right\} \quad \text{(XV)}$$

It will be realized, of course, that $\delta\phi$ can be either positive or negative.

Having now outlined the principle upon which the invention is based, an embodiment will now be described with reference to the schematic diagrams of FIGS. 6 to 10. In this connection considerable help in understanding the operation of this equipment will be derived by reference to United Kingdom Specification No. 1,337,099 (U.S. Pat. No. 3,889,267) which also deals in some detail with the basic conception of phase expressed as a fraction and an integer portion as used above.

Figures 6, 9:
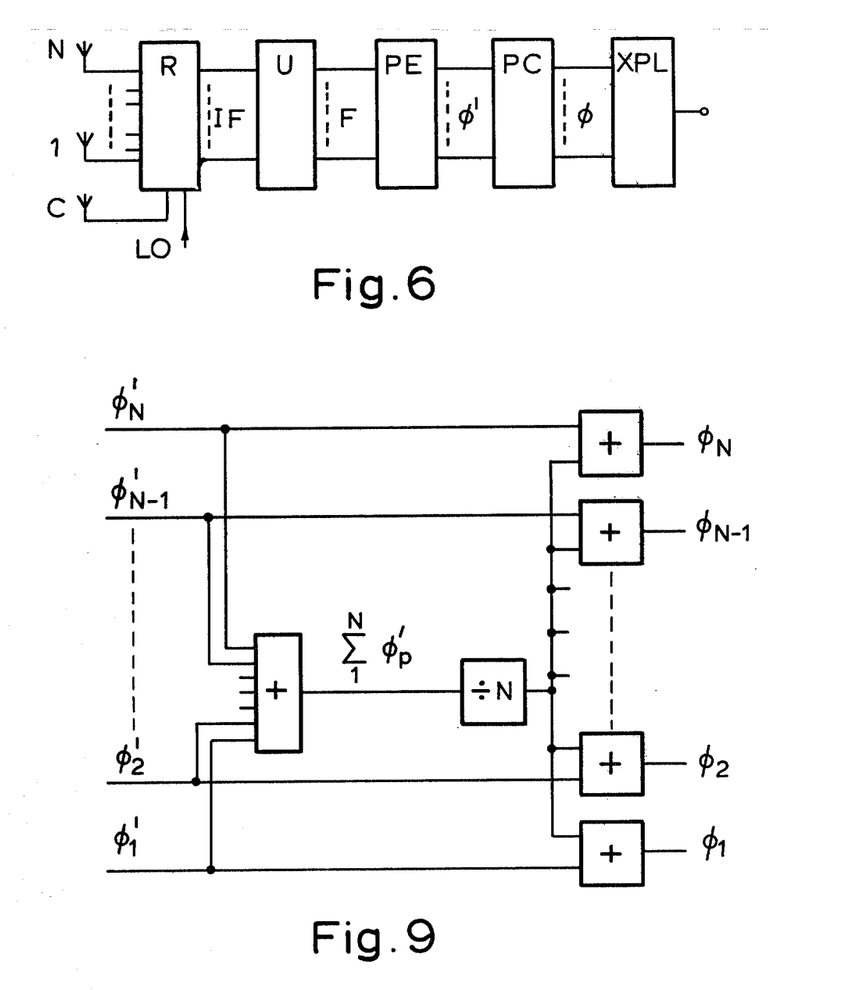
FIG. 6 is a layout in block diagram form of an embodiment of the radio interferometer system according to the invention.
FIG. 9 illustrates a phase-correction stage.

Referring then to FIG. 6 we have the N aerial elements and common central aerial element C of FIG. 1 which feed into a bank of radio receivers R (one for each element). Where the system is required to operate over a given frequency band it is convenient to use superheterodyne receivers and to affect the phase discrimination at a lower, fixed, intermediate frequency. Because of the necessity to preserve at the intermediate frequency the relative phase differences between the signals from the aerials the receivers are all fed, in phase, with local oscillator energy LO from a source not shown. From the receivers R the signals IF pass to a bank of phase discriminators U which, as described above, produce a number of signals each indicating in digital form the fractional portion F of the phase difference measured between the centre aerial element C and one of the circumferential elements by the respective discriminator.

These fractions must now be processed to derive the ordinates of the primary phase graph P in FIG. 3, and in the present embodiment this is done by starting at aerial element 1, assuming $I_1 = 0$, determining the digital phase increments between measurements at adjacent elements and at the same time resolving some of the more likely ambiguities and then producing a series of phase estimates by successive addition of phase increments. Thus the next two stages of the system are a bank of ambiguity resolving stages AR, FIG. 8, and a bank of adders PA at the outputs of which latter appear, still in digital form, the values of $\phi'$ which represent the ordinates of the primary phase graph and which is the initial estimate of the variation of phase around the circular array of aerial elements. These two stages which form the initial phase estimating means are indicated together at PE in FIG. 6.

It is now necessary to sum all these derived values of $\phi'_p$ and divide the result by N, see expressions (III) to (VI) and this is done in a phase correction stage PC the outputs of which, still in digital form, indicate the corrected phases $\phi$ which represent the ordinates of the secondary phase graph S of FIG. 3.

Finally, it is necessary to determine the position of the zero crossing (see FIGS. 4 and 5) in the logic circuit XPL from the output of which appears in digital form the angular position of the zero crossing point or, in other words, the angle of incidence of the received signal.

Figure 7:
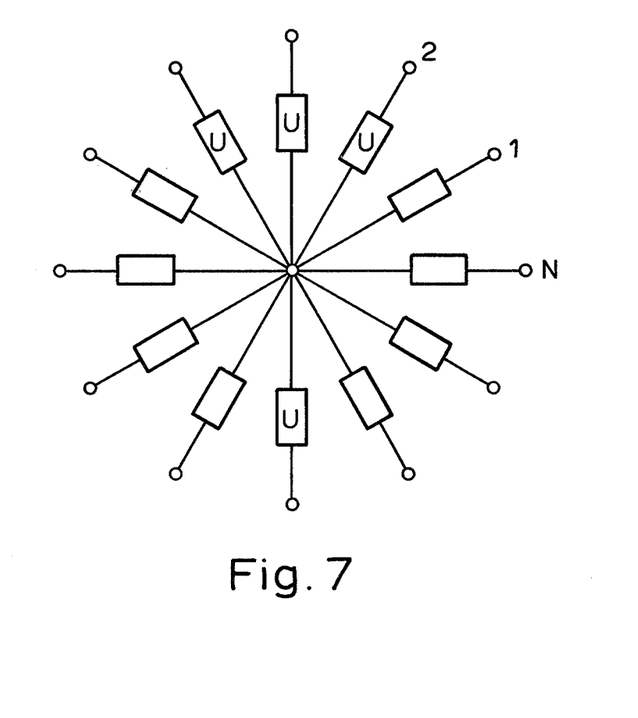
FIG. 7 illustrates an array of aerial elements and associated discriminators.

FIG. 7 illustrates N equally-spaced omni-directional, zerial elements 1, 2 ... N associated with a central element. The phase between each individual circumferential element and the central element is measured by a separate phase-discriminator U.

Figure 8:
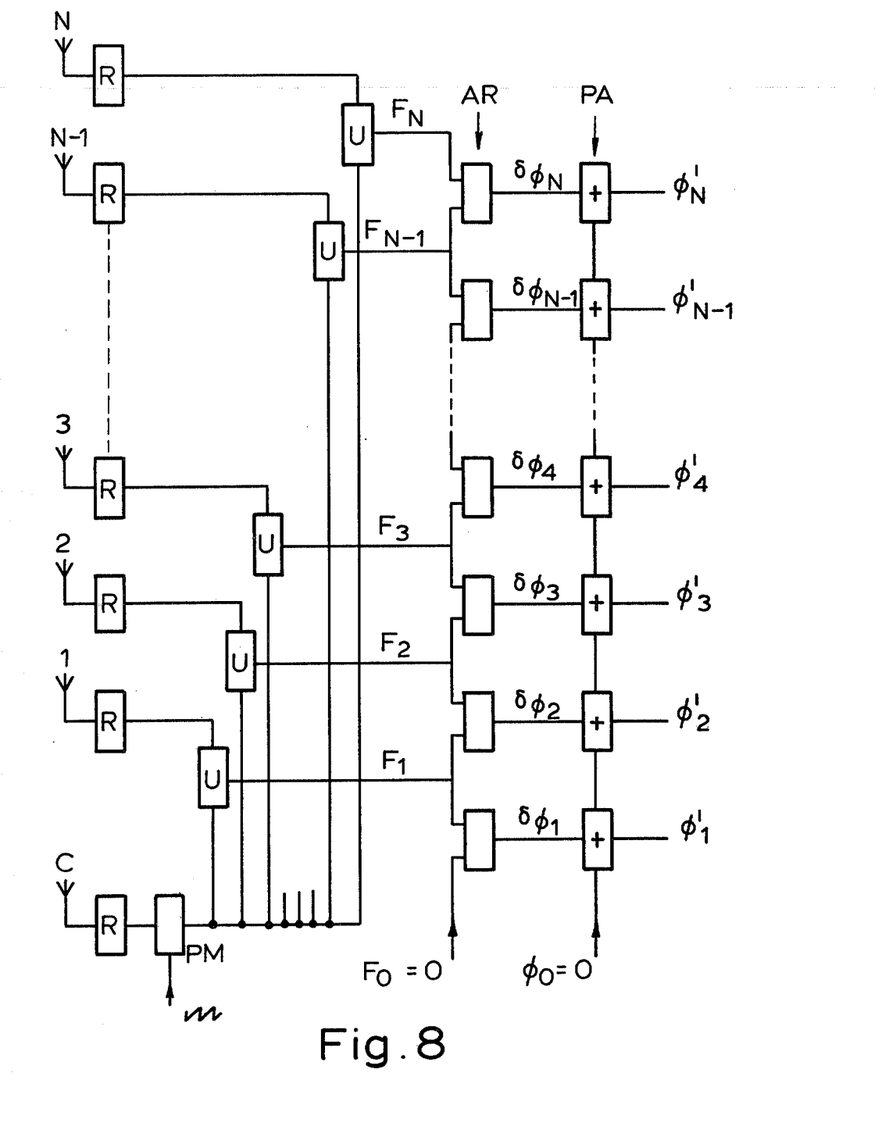
FIG. 8 illustrates an arrangement in block-diagram form of aerials, discriminators and phase-estimating stages.

FIG. 8 shows in block diagram form the arrangements of the stages R, U and PE of FIG. 6. Each circumferential aerial, as seen in FIG. 8, feeds a separate receiver R (not shown in FIG. 6), from which the output passes to a respective phase discriminator U connected also to a common line associated with the output from an identical receiver fed by the central element C: There is also a phase modulator stage PM with the aid of which a "phase wobble" technique may be used to enhance the accuracy of the phase measurements where the digital increment of the phase discriminators is large. This technique, which is purely optional, is described in United Kingdom Patent Specification No. 1,333,546 (3,803,612). Energy from a local oscillator source (not shown) is supplied to all the receivers, including that associated with the central element in the same phase so that the phase information in the signals from the aerial elements will be retained in the intermediate-frequency output from each of the receivers R.

At the outputs of the phase discriminators U signals occur each indicating the fractional portion F of the phase difference measured between the centre element and one of the circumferential elements by the respective discriminator. Preferably, the discriminators produce an output in binary digital form and all the stages which follow the discriminators are arranged to handle digital information. Methods of deriving a digital indication of phase are well-known and are referred to in the above-mentioned United Kingdom Specifications Nos. 1,337,099 and 1,333,546: see also United Kingdom Specification No. 1,295,010 (U.S. Pat. No. 3,768,007).

In the embodiment at present being described the digital outputs from the discriminators, which outputs represent the fractional portions of the phases measured are manipulated so as to arrive at a series of digital increments $\delta\phi_1$ to $\delta\phi_N$ which are then added to produce a series of phase estimates $\phi'_1$ to $\phi'_N$. As shown in FIG. 8, the digital outputs from the discriminators U are applied to a series of ambiguity resolving logic circuits AR of the kind described with reference to FIG. 12 of United Kingdom Specification No. 1,337,099 referred to above so as to produce from the output of each logic circuit, in a manner as described in that specification, an output representing a digital increment $\delta\phi$.

In a manner similar to that described in United Kingdom Specification No. 1,337,099 these digital phase increments $\delta\phi_1$ to $\delta\phi_N$ are added in a bank of adders to produce the phase differences $\phi'_1$ to $\phi'_N$ which represent the primary phase graph discussed above. In order to preserve symmetry a digital representation of the fractional angle F is applied to the bottom one of the bank of logic circuits AR. Similarly, a digital representation corresponding to $\phi_o=0$ is applied to the bottom one of the bank of adders. The outputs $\phi'_1$ to $\phi'_N$ of the arrangement illustrated in FIG. 8 are now applied to a phase correction circuit as illustrated in FIG. 9. This performs the functions required by expression (VI) above and comprises an adder in which all the primary phase estimates are added followed by a dividing stage which divides this sum by a factor N so as to produce the value $I_1$ and a bank of adders for adding $I_1$ to each of the digital signals $\phi'$. Thus we have at the output of the arrangement of FIG. 9 a series of digital numbers indicating the corrected phases $\phi_1$ to $\phi_N$ and representing the secondary phase graph.

It will of course be obvious that as the phases of the signals incident upon the circumferential elements are being measured relative to the signal incident upon the central element then some of these phases will be positive and some will be negative. The outputs $F_1$ to $F_N$ from the discriminators will always be in positive form but the phase increments $\delta\phi$ may be either negative or positive. The outputs of the logic stages AR therefore include an extra digital position so as to indicate whether the digital increment is positive or negative. This technique is discussed in United Kingdom Specification No. 1,337,099 referred to above.

Figure 10:
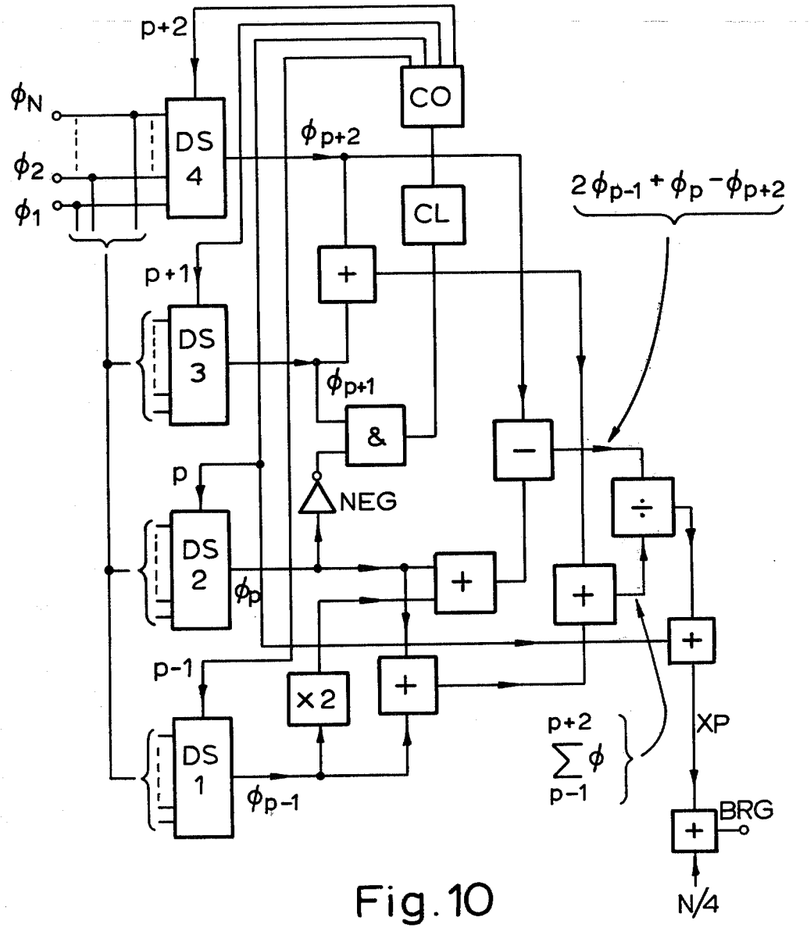
FIG. 10 illustrates a crossing-point logic arrangement.

The corrected phase outputs $\phi_1$ to $\phi_N$ from FIG. 9 are finally led to the logic circuit for determining a zero crossing (see FIG. 6) which is shown in detail in FIG. 10. In this embodiment the crossing point logic is operative for determining a zero crossing in accordance with the method shown in FIG. 5 and denoted by expression (XI). The secondary phase information is fed in parallel to four data selectors DS1 to DS4. Each data selector is arranged successively to switch each one of the N inputs of an output under the control of a counter CO, which in turn is driven by a clock pulse generator CL. Each data selector comprises an appropriate number of multiplexers or parallel-to-series converters, for example of the 74151 type, and is so arranged that, for example, when DS4 is switched to input $\phi_N$ then DS3 is switched to input $\phi_{N-1}$, DS2 is switched to input $\phi_{N-2}$ and DS1 is switched to input $\phi_{N-3}$. This system of switching is indicated diagrammatically in FIG. 10 where each of the selectors in the Figure is pulsed from a respective output of the counter CO.

Let us now assume that we have reached the condition described with reference to FIG. 5 where two of the measured phase differences are negative and the other two are positive. This is the condition defined by expression (XI) and FIG. 10 has therefore been labelled with the appropriate phases. As shown in FIG. 10 $\phi_{p+1}$ and $\phi_{p+2}$ are added together as are also $\phi_p$ and $\phi_{p-1}$. These two sums are then added to produce the summation term of, that is to say the denominator in, expression (XI) which is also indicated in FIG. 10. Also, $\phi_{p-1}$ is multiplied by 2 and then added to $\phi_p$ and from this sum is subtracted $\phi_{p+2}$ to produce, still in digital form, a representation of the numerator term $(2\phi_{p-1}+\phi_p-\phi_{p+2})$, again in accordance with expression (XI). The numerator and denominator terms are then divided in a dividing stage and are added to p to produce the representation of the zero crossing point XP to which is added the number N/4 to provide an output representation of the bearing BRG.

The arrangement also comprises means for stopping the clock when the position illustrated in FIG. 5 and represented by expression (XI) is reached; from DS2 to DS3 a further output, representing only the sign of the phases $\phi_p$ and $\phi_{p+1}$ is taken. The positive sign bit PS from DS3 is applied to one input of an AND-gate and the negative sign bit NS from $\phi_p$ is applied through an inverter NEG to the other output of the AND-gate. The output of this gate is then applied either to the counter CO or, as shown in FIG. 10, to the clock pulse generator CL so as to stop the count. The zero crossing point indication at the output terminal XP is thus held, and can be displayed by a convenient means.

In the preceding description of the embodiment illustrated with reference to FIGS. 1 to 10 a system having a central element C and a number of peripheral elements has been chosen for the purpose of illustration. However, it will be understood that the general principles discussed particularly with reference to FIGS. 2 to 5, 9 and 10 are equally applicable to an arrangement where no central element is provided, as are also the arrangements of FIGS. 6 and 8 subject to obvious modifications for the system employed.

Figure 11:
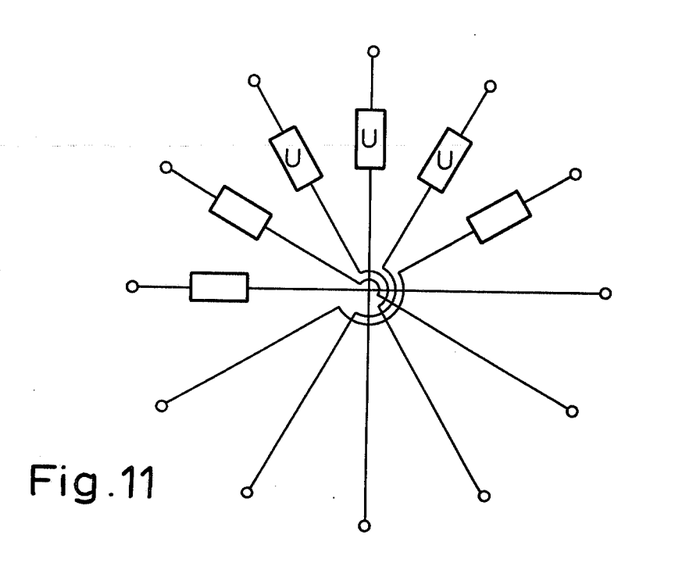
FIGS. 11, 12 and 13 illustrate further arrangements of aerial elements and associated discriminators.
Figures 12, 13:
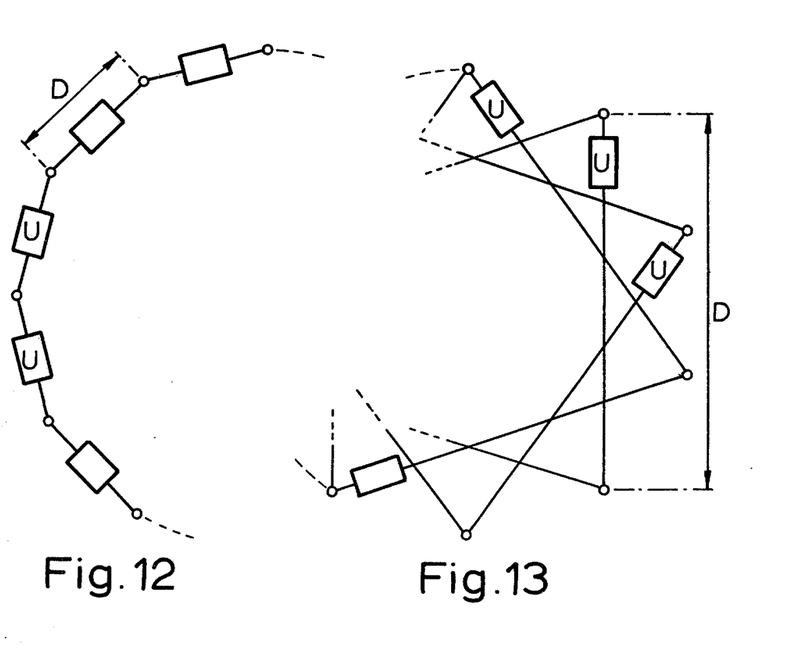

This can be appreciated by references to FIGS. 11, 12 and 13 which indicate three other arrangements none of which uses a central element.

In FIG. 11, instead of the phases of each peripheral element and that of the centrel element being compared, the comparison is between diametrically opposite elements. Bearing in mind the principles set out above, it can be seen that the angle $\delta\theta$ is the same in this embodiment as in the one discussed above, but the spacing of the aerial elements in each interferometer pair is now 2R instead of R; it therefore follows (compare expression (XIII) that in this arrangement $\delta\theta_{max}=\lambda/2R$ and that if one allows for a 50% error as discussed above then $$\delta\theta_{max} = \lambda/4R.$$

Similar considerations apply to the arrangement illustrated in FIG. 12 where the interferometer pairs are formed one by each adjacent pair of elements. Here again the angle $\delta\theta$ is the same as in FIGS. 7 and 11, and again as is common to FIGS. 7 and 11 the phase graph is in the form of a sinusoid.

FIG. 13 may be regarded as a general case where the interferometer pairs are formed one by each element and another element which is spaced from it by one or more intermediate elements. FIG. 11 can be regarded of course as a special case of FIG. 13. Again the arrangement of FIG. 13 will provide a number of ordinates of a sinusoid, as do the arrangements of FIGS. 7, 11 and 12, so that the processing is to all intents and purposes the same as that already described with reference to FIGS. 1 to 10.

The requirement for unambiguous resolution, is in general, $\delta\theta_{max} = \lambda/D$, where D is the spacing of the aerials of an interferometer pair, see, for example, FIGS. 12 and 13, resulting, where a 50% error allowance is made, of a practical value of $\delta\theta_{max} = \lambda/2D$.

As has been mentioned above, if desired, the positions of the zero crossings of the sinusoid can be determined and averaged to estimate the angle of incidence. The arrangement for determining the other zero crossing than that already determined at an earlier instant is very similar to that described with reference to FIG. 10. The main difference is that for $(p-1) \ldots (p+2)$ would be substituted $(p-1+\frac{1}{2}N) \ldots (p+2+\frac{1}{2}N)$.

Figure 14:
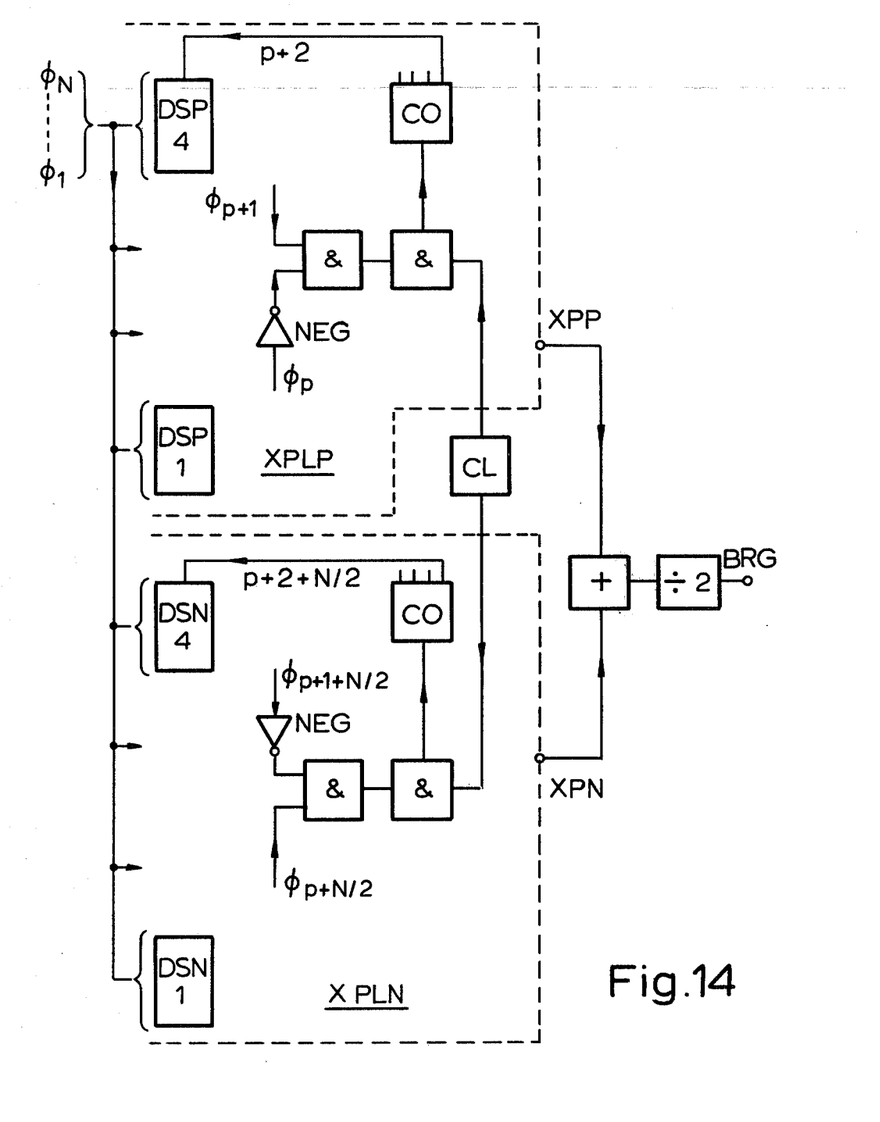
FIG. 14 illustrates a crossing-point logic arrangement and FIG. 15 illustrates another crossing-point logic arrangement.

FIG. 14 is a block diagram showing such an arrangement and may be compared with the arrangement illustrated in FIG. 10. In FIG. 14 the corrected phases are fed to two logic circuits for determining a zero crossing, namely a circuit XPLP for determining a first zero crossing and is the same as the circuit described with reference to FIG. 10, and a circuit XPLN for determining the other zero crossing and which differs from XPLP as described above. The two outputs XPP and XPN of these circuits are then averaged to produce a digital output BRG indicative of the angle of incidence. It will of course be understood that although in FIG. 14 it has for convenience been assumed that the crossing points are more or less diametrically opposite each other, that is to say between p and (p+1) and between (p+N/2) and (p+1+N/2) respectively, in practice this may not necessarily be the case. However, since each logic circuit determines the position of a zero crossing independently, this will not affect the validity of the entire logic circuit. Furthermore it will be obvious that this technique of averaging the positions of the zero crossing points is not confined to use with the particular form of logic necessary to comply with expression (XI) and illustrated in FIG. 10, but is equally applicable if the positions of the zero crossing points are obtained by other means, for example that illustrated in FIG. 15 using the logic of expression (X).

Figure 15:
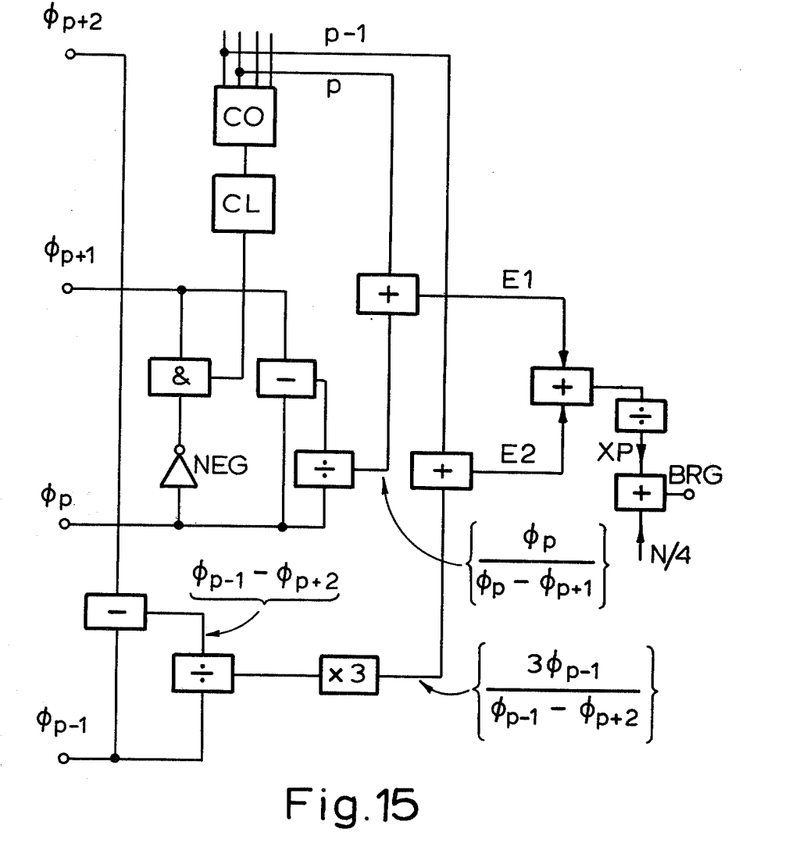

FIG. 15 now illustrates a part of a crossing point and bearing digital logic circuit which derives from the method described with reference to FIG. 4 and denoted by expression (X) above. In this arrangement and for simplicity only two estimates E1 and E2 are averaged.

The four phases $\phi_{p-1}$ to $\phi_{p+2}$ are obtained from a number of data selectors, not shown, and are stepped under the control of a clock-pulse generator CL and counter CO as has already been described with reference to FIG. 10. Means for stopping the clock-pulse generator at the appropriate position are, again, the same as illustrated in FIG. 10.

Considering first the determination of E2 as represented by expression (VIII), $\phi_{p-1}$ and $\phi_{p+2}$ are subtracted to produce $(\phi_{p-1} - \phi_{p+2})$ which is then divided into $\phi_{p-1}$ and multiplied by 3; thereafter (p−1) is added to produce in digital form the representation of E2.

Similarly, $\phi_{p+1}$ is subtracted from $\phi_p$ and the difference is divided into $\phi_p$, thereafter p is added to produce in digital form the representation of E1.

E1 and E2 are then added and divided by 2 to produce at the output of terminal XP a digital representation of the position of the zero crossing point as defined by expression (X).

A practical implementation of an embodiment of the system according to the invention utilized 64 aerial elements in a circle having a radius of 25 cm and one central element, as shown in FIG. 1. The wavelength $\lambda$ was 6 cm and all elements were simple monopoles.

As a result of the rotational symmetry associated with the circular array of aerial elements, the system according to the invention is immune to reflection errors. Such errors can be considered as interfering signals. There are always two interferometer pairs in which these signals give rise to substantially equal, but opposite errors (see FIGS. 7, 12 and 13). As a result of the method used for solving the ambiguity these errors will be self-cancelling.

What is claimed is:

1. A method of finding the direction of a radio source using a circular array of evenly-spaced aerial elements to find the phase differences between the signals from the source and received by successive pairs of aerial elements, from said phase differences a position on the circle being determined indicative of the direction of the radio source, characterized in that in digital form a plurality of phase differences are measured, the magnitude of the phase differences occurring for successive pairs of aerial elements having a sinusoidal variation, in that each digitally-expressed phase difference is examined to determine at least one point where the sinusoid crosses the zero axis and in that from this zero crossing point a position on the circle is derived indicative of the angle of incidence of the rays from the source relative to a reference direction.

2. A method as claimed in claim 1, characterized in that the digitally-expressed phase differences are summed for determining an average phase difference and that this average phase difference is subtracted from each digitally-expressed phase difference for supplying a number of corrected phase differences of which the successive magnitudes define a sinusoidal having an average value of zero.

3. A radio interferometer system for measuring the angle of incidence of signals from a radio source, comprising a plurality of substantially omni-directional aerial elements equally-spaced around the circumference of a circle and a series of phase discriminators each coupled with a respective pair of elements so as to form a plurality of interferometer pairs, characterized in that means are provided for deriving from the output signals of the discriminators a series of digitally-expressed numbers representing the ordinates of a sinusoidal phase graph, in that means are provided for examining the series of numbers to determine at least one point at which the phase graph has a value of zero and in that means are provided for deriving from this zero point a position on the circle indicating the direction of the source relative to a reference direction.

4. A radio interferometer system as claimed in claim 3, arranged to receive energy of wavelength $\lambda$, characterized in that it comprises a substantially omnidirectional aerial element at the centre of the circle forming between the central element and each of the circumferential elements a plurality of interferometer pairs all of the same spacing R where R is the radius of the circle and wherein the angle subtended at the centre of the circle by two adjacent elements is not greater than $\lambda/R$ radians.

5. A system as claimed in claim 3, characterized in that the interferometer pairs are formed one by each element and the diametrically opposite element and wherein the angle subtended at the centre of the circle by two adjacent elements is not greater than $\lambda/2R$ radians.

* * * * *